United States Patent [19]

Siol et al.

[11] Patent Number: 5,266,645
[45] Date of Patent: Nov. 30, 1993

[54] ACRYLATE-METHACRYLATE GRAFT POLYMERIZATE

[75] Inventors: Werner Siol, Darmstadt; Wolfgang Klesse, Mainz; Klaus Koralewsky, Reidstadt; Ulrich Terbrack, Reinheim, all of Fed. Rep. of Germany

[73] Assignee: Roehm GmbH Chemische Fabrik, Darmstadt, Fed. Rep. of Germany

[21] Appl. No.: 810,121

[22] Filed: Dec. 19, 1991

[30] Foreign Application Priority Data

Dec. 22, 1990 [DE] Fed. Rep. of Germany ....... 4041525

[51] Int. Cl.$^5$ ............................................. C08F 265/04
[52] U.S. Cl. ................................... 525/309; 525/302; 524/832
[58] Field of Search ................. 525/302, 309; 524/832

[56] References Cited

U.S. PATENT DOCUMENTS

| 877,847 | 1/1908 | Lentz et al. | 91/183 |
| 3,793,402 | 2/1974 | Owens | 525/81 |
| 3,808,180 | 4/1974 | Owens | 525/291 |
| 3,843,753 | 10/1974 | Owens | 525/72 |

FOREIGN PATENT DOCUMENTS 0357036 3/1990 European Pat. Off. .
975421 11/1964 United Kingdom .

Primary Examiner—Morton Foelak
Assistant Examiner—Rachel Johnson
Attorney, Agent, or Firm—Oblon, Spivak, McClelland, Maier & Neustadt

[57] ABSTRACT

Graft polymerizates on the basis of acrylates and methacrylates, comprise one or more graft monomers of the formula (I)

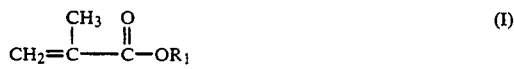

where $R_1$ stands for a hydrocarbon group having 2-24 carbon atoms and a base polymer of which 55-100 wt. % is synthesized from one or more monomers of the formula (II)

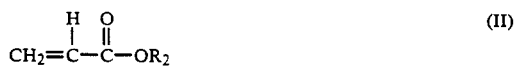

wherein $R_2$ stands for a hydrocarbon group having 2-24 carbon atoms, provided that the groups $R_1$ and $R_2$ exhibit Van-der-Waals volumes which differ by less than 30%, and that at least 10 wt. % based on the total monomers of formula (I) are grafted on the base polymer.

14 Claims, 2 Drawing Sheets

ACRYLATE-METHACRYLATE GRAFT POLYMERIZATE

BACKGROUND OF THE INVENTION

1. Field of the Invention

The present invention relates to acrylate-methacrylate-graft polymerizates, which serve as thermoformable materials, and the moulded bodies manufactured therefrom; as well as aqueous dispersions of acrylate-methacrylate graft polymerizates and the films and foils manufactured therefrom. The products are characterized by, among other things, very good low temperature strength, good blocking behavior and high cohesion.

2. Description of the Prior Art

Acrylate-methacrylate-graft polymers have achieved wide commercial application, especially as impact modifiers for thermoplastically processable moulding compounds (see, for example, British Patent 975,421).

Such acrylate-based impact modifiers are usually manufactured according to the process of emulsion polymerization, where in the first reaction step a mixture of acrylate and crosslinker is polymerized into a crosslinked polyacrylate-latex particle and in a second process step a hard shell made of polyalkylmethacrylate, usually polymethylmethacrylate (PMMA), is grafted on this crosslinked particle. Usually the hard polymethacrylate shell serves for better handling of the acrylate elastomers and for binding the polyacrylate particles to the plastics to be modified, usually polyvinyl chloride (PVC), since PMMA and PVC are quite compatible and thus, for example, a butyl acrylate rubber can be bonded quite well to PVC by means of PMMA grafted on the butyl acrylate rubber.

By suitably varying the hard polymethacrylate shell of the latex particle, other plastics can also be impact-modified; for example, by grafting a methyl methacrylate-cyclohexyl methacrylate copolymer shell on an acrylate rubber, an entire line of plastics can be impact modified, since this methyl methacrylate-cyclohexyl methacrylate copolymer is compatible with a whole series of plastics (e.g. PVC, polystyrene, PMMA) (see European Published Patent Application 312 878). Especially useful are the crosslinking systems of the acrylic elastomers, where frequently a combination of crosslinkers (butylene glycol diacrylate) and graft crosslinkers (e.g., allyl methacrylate) is used (cf. German Offenlegungsschrift 21 16 653).

Frequently the refractive index of the polyacrylate elastomer phase is also adjusted, through copolymerization with styrene, to the refractive index of the PMMA phase, in order to obtain good optical properties of the impact-modified polymer mixtures (see, for example, European Published Patent Application 113 924).

Special importance is placed, generally, on good crosslinking of the acrylate elastomer, where this crosslinking is frequently characterized by the gel body content or the maximum degree of swelling (Japan Kokai 7624, 689; CA 85: 47521 r (1976)).

In some cases butadiene and other readily graftable monomers are also copolymerized in order to obtain, on the one hand, well crosslinked rubber particles and, on the other hand, a good methacrylate graft.

Similarly, reactive groups to improve the grafting of polymethacrylate and polyacrylate are used. Examples are primarily epoxide groups, for example, glycidyl methacrylate; methylol groups, for example, methylol methacrylamide; maleic acid anhydride; isocyanatoethyl methacrylate and other compounds that can be converted with nucleophilic groups. Also the use of hard radiation to improve the grafting of methacrylates on specified acrylates is described.

Other attempts to obtain well grafted acrylate/methacrylate systems can be seen in studies that try to improve the grafting of methacrylates on the acrylates by means of a multi-step polymerization process with a step-by-step transition from an acrylate to a methacrylate. For example, in French Patent 2,069,007 U.S. application Ser. No. 877,847 a dispersion prepared by:

a first step comprising 99%s $C_1$–$C_2$ alkyl acrylate and 1% butylenediacrylate, a second step comprising 60% methyl methacrylate (MMA) and 40% (m)ethylacrylate, a third step comprising 90% methyl methacrylate and 10% (m)ethylacrylate or methoxyethyl acrylate, and a fourth step comprising a 90:2 mixture of MMA and methylacrylate or methoxyethyl acrylate with 4% methacrylic acid, based on the mixture is described.

Similarly, an acrylate film in which a first step comprising 90% butyl acrylate and 10% MMA and 0.5% triallyl cyanurate as crosslinker-containing mixture is converted with a second step comprising 50% MMA and 50% butyl acrylate and finally a third step comprising 10% butyl acrylate and 90% MMA is described in Japan. Kokai 7864 229 (CA: 89: 1247 576 p). The process is analogous in Japan. Kokai 7733,991 (CA: 87: 543093r).

In European Published Patent Application 56 242 and German Application 31 00 748, an elastomer powder is described that is prepared through graft polymerization from a butyl acrylate latex with methyl methacrylate.

Elastomers, i.e., materials that can be expanded by at least twice their starting length through the effect of a slight force at room temperature and above and following elimination of the force return again rapidly and virtually completely into the original shape, have found a variety of possible applications in technology. Thermoplastically processible elastomers are an especially interesting group.

Usually thermoplastic elastomers represent multiphase systems in which the phases are homogeneously dispersed. The phases are connected multiple times through graft and block polymerization. (Cf. H. F. Mark et al, Encyclopedia of Polymer Science & Technology, Vol. 5, pp. 416–430, J. Wiley 1986). Conceptionally it is assumed that there is at least one hard phase, which can be liquefied while heating, and a soft phase, which behaves like rubber at room temperature. If the impact modifiers have as a rule fine, crosslinked rubber particles in a hard matrix, the thermoplastic elastomers exhibit generally a continuous rubber phase with embedded hard "crosslinking" domains. Whereas the thermoplastic elastomers used primarily in engineering represent predominantly block copolymers with hard systems comprising polystyrene, polysulfone, polyester, polyurethane or polycarbonate and "softer" segments comprising polyolefins, polysiloxane, or polyether, in European Published Patent Application 0 381 065 acrylate-based elastomers are proposed that comprise at least 40 wt. % copolymerizates having a molecular weight >50,000 Daltons, 50–95 wt. % of which are synthesized from α) acrylate monomers and the rest from β) macromonomers comprising vinylic groups and thus covalently bonded to a polyvinyl unit, selected from the group of acrylates and methacrylates having a glass temperature Tg of at least 60° C. and a molecular weight of 500-100,000 Daltons.

Comb polymers with a polybutyl acrylate main chain and side chains comprising polymethyl methacrylate macromonomers show, for example, the properties of thermoplastically processible elastomers (TPE) that are known from styrene-butadiene-styrene three block copolymers. As interesting as such macromonomer-comb polymers are with respect to their properties, the fact cannot be overlooked that they are very special products of a relatively expensive technology and, presumably, will remain as such. Therefore, a desired objective is to provide thermoplastically processible elastomers from the same monomer groups with comparably good usage and processing properties, whose manufacture was to be connected with lower technological complexity than, for example, in the case of the aforementioned comb polymers.

A certain qualitative approximation of the above-described comb polymers could have been expected, perhaps, the soonest from the graft polymerization method, when the studies of the present Applicants had shown that the whole picture of the comb polymer properties is relatively insensitive to polymethylmethacrylate that is not bonded to the comb polymers. The road via graft polymerization to thermoplastically processible elastomers based on acrylates seemed closed, insofar as it turned out that, even under ideal graft conditions (feed polymerization, absence of transfer-active solvents and auxiliaries), no graft polymerizates are obtained that, with the same composition, achieve even only remotely the properties of the cited butyl acrylate-methyl methacrylate-macromonomer-comb polymers (e.g., tear strength at $\delta R = 10$ MPa; elongation at break $\epsilon R = 400\%$ and the like).

The polymers obtained thus were stickier, exhibited only low strength, and a pronounced tendency for stress whitening at low stress. Just as unsuccessful was an attempt to obtain elastomeric materials with somewhat satisfactory properties by grafting methyl methacrylate on preformed polyethylacrylate. All of these negative experiences with graft polymerization seemed largely preprogrammed in light of the experiences with block polymers reduced to the common denominator in the Encyclopedia of Polymer Science & Technology, vol. 5, loc. cit., page 417: "Most polymers are thermodynamically incompatible with other polymers and mixtures separate into two phases. This is true even when the polymeric species are part of the same molecule, as in these block copolymers."

In light of these failures with the representatives of monomers or polymers that were tested and generally rated as typical of their category by experts it seemed—as aforementioned—somewhat hopeless to arrive by means of a simple grafting of (meth)acrylate monomers on poly(meth)acrylates at elastomers, which meet the requirements of industry by achieving, e.g., the standard which was specified with the comb polymers known from European Published Patent Application 0 381 065.

SUMMARY OF THE INVENTION

It has now been found surprisingly that elastomeric acrylic resins with excellent mechanical and optical properties can be obtained if a number of technical rules are observed that are explained in the following and that find their expression in the present claims.

It has now been found that surprisingly (meth)acrylate-based graft polymerizates in which a graft monomer of the formula (I)

where $R_1$ stands for a hydrocarbon group having 2-24 carbon atoms, preferably 2-8 carbon atoms and, in particular, for the groups ethyl, butyl, isobutyl and 2-ethyl hexyl, or a mixtures thereof is grafted on a base polymer of which 55-100 wt. %, in particular 85-100 wt. % is synthesized from monomers of the formula (II)

wherein $R_2$ stands for a hydrocarbon group having 2-24 carbon atoms, preferably 2-8 carbon atoms and, in particular, for the groups ethyl, butyl and 2-ethyl hexyl, provided that the groups $R_1$ and $R_2$ exhibit Van-der-Waals volumes which differ by less than 30%, fulfill especially well the aforementioned requirements.

Additionally, it is advantageous that the heat of mixing of the hydrogenated monomer components of the formula (I-hydr)

and the hydrogenated monomer components of the formula (II-hydr)

where $R_1$ and $R_2$ have the aforementioned meanings, amounts to <100 cal/mol of mixture each. Preferably the deviations of the Van-der-Waals volumes according to Bondi [A. Bondi, J. Phys. Chem. 68, 441 (1964)]are less than 20%.

The determination of the heat of mixing of the hydrogenated monomer components is generally not absolutely necessary, especially since in a number of cases they can be taken directly from the relevant tabular values. Reference is made to the monograph "Heat of Mixing of Liquids" by W. P. Belousow and A. G. Moratschewski, Verlag Chemie, Leningrad 1970. By definition $R_1$ and $R_2$ stand in formulas (I) or (II) and (I-hydr) or (II-hydr) for a hydrocarbon group having at least 2 to 24 carbon atoms, preferably for a non-cyclic, optionally branched alkyl group, in particular having a minimum of 2 and a maximum of 8 carbon atoms or a cyclic hydrocarbon group having 5 to 12 ring members, in particular an alicyclic group, or a phenyl or naphthyl group.

BRIEF DESCRIPTION OF THE DRAWING FIGURES

DETAILED DESCRIPTION OF THE INVENTION

Figure 1:
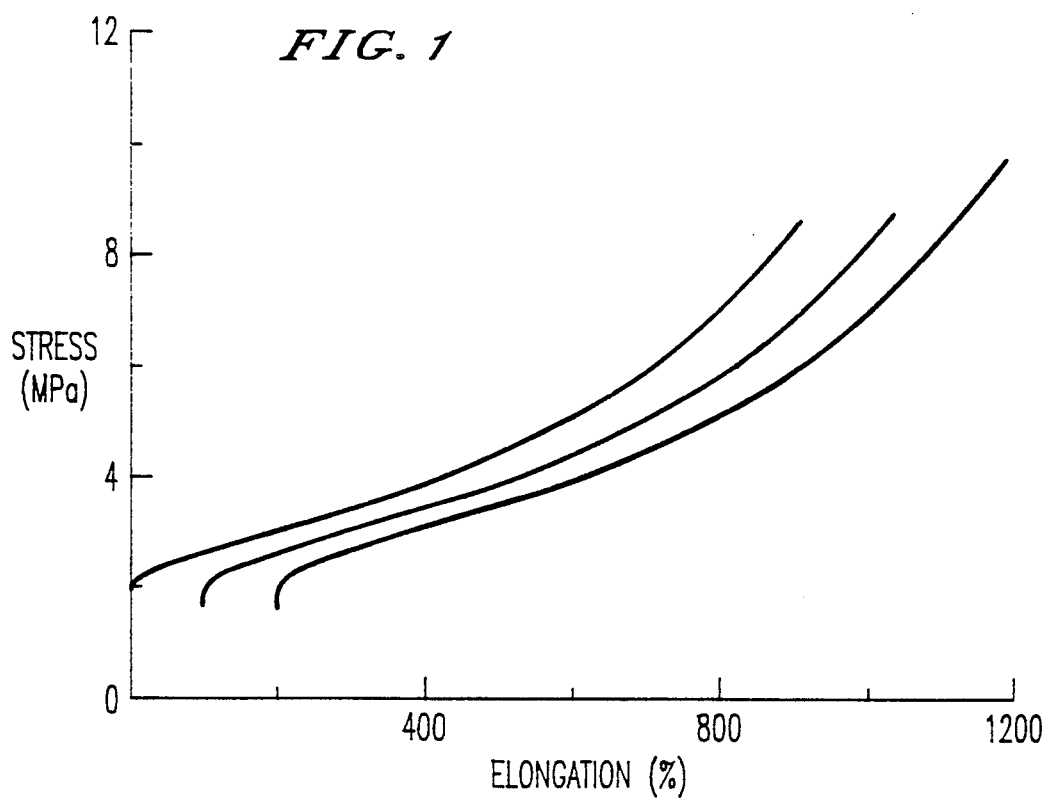
FIG. 1 is a graph showing stress-elongation curves for the product of Example 1.

A number of suitable combinations of I and II can be derived from German Offenlegungsschrift 37 08 427 or U.S. Pat. No. 4,900,791. There polymer mixtures comprising polyacrylates and polymethacrylates are described. Thus, it is advantageous to graft polymers from the series of polymethacrylates cited in the German Offenlegungsschrift 37 08 427 on the polyacrylates that are compatible with these polymethacrylates.

Furthermore, it is noted that the monomers participating in the synthesis of the base polymer are normally in a weight proportion of 10 to 90 up to 90 to 10 to the graft monomers, preferably 90 to 10 up to 40 to 60, especially preferred in a ratio of 85 to 15 up to 50 to 50.

In addition to the monomers of formula (I) other expediently selected monomers can be cografted, for example, other methacrylates, especially preferred is methyl methacrylate, which can be contained in an amount of 0-80 wt. %, preferably 10-60, quite especially preferred 15 to 40 wt. % of the graft monomers. Similarly, it is possible also to use acrylates, e.g., methyl acrylate or ethyl acrylate in ratios of 0.1-10 wt. %, preferably 0.2-5 wt. % of the graft monomers.

The proportion of functional comonomers, in addition to the monomers of formula (I), such as methylol methacrylamide, methacrylic acid and methacrylamide, may amount to <5 wt. %; preferably the mixture contains no glycidyl methacrylate and no maleic acid anhydride. Similarly, the proportion of styrene, acrylonitrile and halide-containing monomers to the mixture should amount to <10 wt. %, preferably <1 wt. % and quite especially preferably 0 wt. %.

In general, the molecular weight of the base polymer (determined by viscosimetry or light scattering) ranges from 200,000 to 1,000,000,000 Daltons, preferably up to 10,000,000 Daltons. Preferably the base polymers are not crosslinked even after grafting However, it can happen that the originally highly polymeric, non-crosslinked base polymer is slightly crosslinked by the grafting on of the monomer mixture (proportion of crosslinking points <0.01 wt. % preferably <0.001 wt. %). Quite especially preferred are highly polymeric, non-crosslinked base polymers In contrast, the graft branches, i.e., the polymers grafted on the base polymer have significantly shorter chains. Generally, the molecular weight of graft branches amounts to 1,000-1,000,000 Daltons, preferably 2,000-500,000, especially preferred 5,000-200,000. Generally, 10-100 wt. % (in particular 20-95 wt. %) of the graft monomers are grafted on the graft substrate (i.e., the base polymer).

55-100 wt. % especially preferred 85-100 wt. % and quite especially preferred 91-100 wt. % of the base polymer is made of the monomers of formula II.

As other monomers, the base polymer can contain other monomers that can be copolymerized with acrylates in proportions of ≦45 wt. %, preferably in proportions of <15 wt. % and quite especially preferred in proportions of <9 wt. % and down to 0.1 wt. %. Examples thereof are in particular methacrylates. Correspondingly, it is preferred that one starts from mixtures comprising 2 different monomers of formula II. The base polymer can contain, in proportions of a maximum of 25 wt. %, preferably of <15 wt. %, styrene. Of special interest are optionally substituted phenyl(alkyl)acrylates such as benzyl acrylate or phenylpropylacrylate, which can be contained in proportions of 0-30 wt. %. Methyl acrylate can also be copolymerized in proportions of up to 45 wt. % for the synthesis of the base polymer.

Hydrophilic monomers such as hydroxyalkyl acrylate or methacrylic acid can be polymerized in proportions of 0-5 wt. %, preferably in proportions of 0-3 wt. %, quite especially preferred in proportions of 0.1-0.5 wt. % of the base polymer.

Butadienes or isoprenes, whose base polymer content should be <5 wt. %, preferably should not be copolymerized; especially preferred are such base polymers that contain neither butadiene nor isoprene. Similarly, multifunctional methacrylates such as butanediol dimethacrylate or multifunctional acrylates such as hexanediol diacrylate should not be used for the synthesis of the base polymer. Their content should be limited to <0.01 wt. % of the base polymer. In contrast, graft active monomers such as allyl(meth)acrylates or vinyl(meth)acrylates such as allyl acrylate can be contained in proportions up to 1 wt. % (preferably in proportions up to 0.3 wt. %, especially preferred up to 0.2 wt. %, quite especially preferred up to 0.09 wt. %).

Especially in the case of high proportions of graft active monomers, chain regulators like mercaptans such as 2-ethyl hexyl thio glycolate must also be used (in proportions of <0.5 wt. %), in order to avoid a crosslinking of the acrylate polymers.

Examples of the present invention are in the following base polymer, in which $R_2$ in formula II stands for ethyl (polyethylacrylate) and graft monomers of the formula (I) in which $R_1$ stands for ethyl (ethylmethacrylate).

In this case, one obtains through simple feed polymerization polyethylacrylate-polyethylmethacrylate graft polymerizates which form transparent, tough plastic films at room temperature. Similarly, good results are obtained if $R_2$=n-butyl and $R_1$=isobutyl.

Preparation of graft polymerizates

In principle, the conventional prior art polymerization methods (cf. H. Rauch-Puntigam, Th. Völker, Acryl- and Methacrylic Compounds, Springer Verlag 1967; H. F. Mark et al Encyclopedia, loc. cit) are suitable for preparing the polymers, wherein during the preparation of the base polymer conditions are used advantageously that do not favor the crosslinking. Usually one uses radical polymerization with the use of conventional radical initiators.

As a rule the base polymer is prepared first and this is grafted with the graft monomers at as high as possible a temperature e.g., 120° C., in solvents which exhibit a low chain transfer tendency, e.g., butyl acetate. Special interest is deserved for the grafting of high molecular weight base polymers directly in the melt without solvent, in an extruder or a pressure reactor, at temperatures ranging from 150° to 200° C. In so doing, the base polymer is first prepared, preferably in solvent, or polymerized and degassed in bulk, only up to a low conversion and subsequently grafted with the graft monomers. To obtain an easily processable base polymer, its molecular weight (MW) must be limited to molecular weights of <1,000,000 Daltons, optionally, by the addition of regulators.

In so doing, the preparation in the emulsion polymerization process in an aqueous environment is of primary importance with respect to the technology. Suitable initiators are conventional radical initiators, especially persulfates such as potassium or ammonium peroxidisulfate in quantities ranging usually from 0.001 to 0.5 wt. %, based on the monomers, optionally also a redox system (cf. Rauch-Puntigam, loc. cit., pp. 221-229). Whereas the use of readily graftable monomers in the preparation of the base polymer yields its advantages, it has been demonstrated to be disadvantageous to force the grafting through a high addition of initiators. Such measures lead to thermolabile polymers. Suitable emulsifiers include any of those conventionally utilized in emulsion polymerization, in particular, anionic emulsifiers such as the alkali salts of paraffin sulfonates, normally in quantities ranging from 0.5 to 5 wt. % (based on the quantity of water).

Of special interest is the preparation of graft polymers in a two step emulsion polymerization process, where the first step—the preparation of the base polymer—is conducted in an advantageous manner as a batch polymerization. In this manner it is possible to obtain in an especially simple manner, e.g., non-crosslinked polyacrylates having a desired high molecular weight (for example J=200-1,000 ml/g; determined according to ISO 1628-6).

Expediently this is followed directly by the grafting, preferably in the form of feed polymerization (i.e., the graft monomers are fed over a period of time into the batch reactor containing the previously prepared base polymer), of the graft monomers. This step is conducted in an advantageous manner at temperatures ranging from 70°-100° C. In so doing, the procedure can be effected in detail, as follows. First, an aqueous emulsion of the monomers for preparation of the base polymer is produced with the addition of emulsifiers and initiators, where a ratio of monomer to water such as approximately 1:2 can pass as a rule of thumb.

It is advantageous to proceed in such a manner that, first, only the peroxidic partner of the redox initiator system is added. Then the mixture is heated expediently under an inert protective gas, such as nitrogen or argon or a mixture thereof, to a suitable temperature, for example 35°±10° C. and with the addition of the reducing partner of the redox system. Usually the temperature rises rapidly within a short period of time, as criterion approximately 10 minutes are specified, for example, to approximately 85°±5° C. Then the graft monomers are added preferably by dripping usually within approximately 15 to 90 minutes. Subsequently, while holding the temperature at approximately 80° C., the end polymerization is conducted. Usually the graft polymerizate is obtained as a stable dispersion, which can be dried directly or following the addition of, e.g., ammonia, into a tough, elastic film. The residual monomer content is usually within the ppm range.

Advantageous effects

First, the simple manufacturability of the graft polymerizates of the invention had to be extremely surprising, because from the beginning it did not seem probable that the graft polymerization would run smoothly owing to the expected incompatibility of the products formed directly thereof. The high quality of the class of products made available by the invention must also be categorized as just as unexpected.

Of special interest are the polymerizates of the invention that can be obtained, by simply drying the dispersion, as highly elastic films or foils. Films or foils based on these graft polymerizates show a surprisingly high blocking point, very good cohesion, a dry feel, a high elongation at break and high tear strength. The graft polymers can be transparent. Provided the molecular weight is set at <2,000,000 Daltons, the films or foils are thermoformable. The polymers can be processed by compression moulding, extrusion or injection moulding. Compared to a vulcanized rubber these graft polymers can be recycled 100% as TPE.

Also, of special interest is the good low temperature strength of these materials and the good thermal stability.

Surprisingly, these graft polymers can be handled as powder or pellets, even if the graft monomer content of the total graft polymerizate is only 30 wt. %.

The graft polymerizates are excellently suitable for highly elastic coatings such as hot melt adhesive and they can be welded.

Also, of special interest is the fact that graft polymerizates based on the monomers I and II form films as emulsion polymerizates at room temperature, but are stable to blocking at up to approximately 50° C.

The high mechanical strength of the graft polymerizates does not result, of course, until after heating above the Tg of the graft polymerizate. This confers engineering importance to the polymers especially as heat-sealable polymerizates.

The following examples serve to explain the invention.

In so doing, the following analytical methods were used:

Determination of intrinsic viscosity, J (ml/g), in accordance with ISO 1628-6;

Tear strength, δR, in accordance with the tensile test DIN 53 455 or ISO/R527; and Elongation at break, εR, in accordance with the tensile test DIN 53 455.

EXAMPLES

Example 1 (Graft polymerizate with polyethyl acrylate as the base polymer and ethyl methacrylate as the graft monomer)

An emulsion comprising:

| | |
|---|---|
| 600.0 g | water |
| 300.0 g | ethyl acrylate |
| 0.6 g | methacrylic acid |
| 3.0 g | Na salt of a C15 paraffin sulfonate |
| 0.5 g | ammonium peroxidisulfate |
| 2.0 mg | FeSO$_4$ | was heated to 35° C. and treated with 0.3 g of Na$_2$SO$_5$ under inert gas. The temperature rose within 11 minutes to 86° C.; immediately thereafter 130 g of ethyl methacrylate were added drop by drop within 15 minutes. For the end polymerization, the mixture was stirred for another 30 minutes at approximately 80° C., then it was cooled. A stable dispersion was obtained that could be dried directly or following the addition of ammonia into a tough, elastic film.

Analytical data:

Residual monomer content: 32 ppm ethyl acrylate, 315 ppm

| Analytical data: | |
|---|---|
| | ethyl methacrylate |
| J value (polyethylacrylate prior to grafting): | 615 ml/g |
| J value (final product): | 601 ml/g |

Following drying in a circulating air cabinet (70° C.) a transparent film is obtained that exhibits a wax-like grip. For additional characterization see FIG. 1 (tensile test DIN 53455)

$\sigma R = 8.36$ MPa
$\epsilon R = 895\%$

Other properties: the film is unusually tough even at $-15°$ C. and shows high cohesion.

Example 2

The test is repeated according to Example 1, but a somewhat different composition of monomers of the base polymer was selected:

| 300.0 g | ethyl acrylate |
|---|---|
| 0.6 g | allyl methacrylate (instead of methacrylic acid) |

Figure 2:
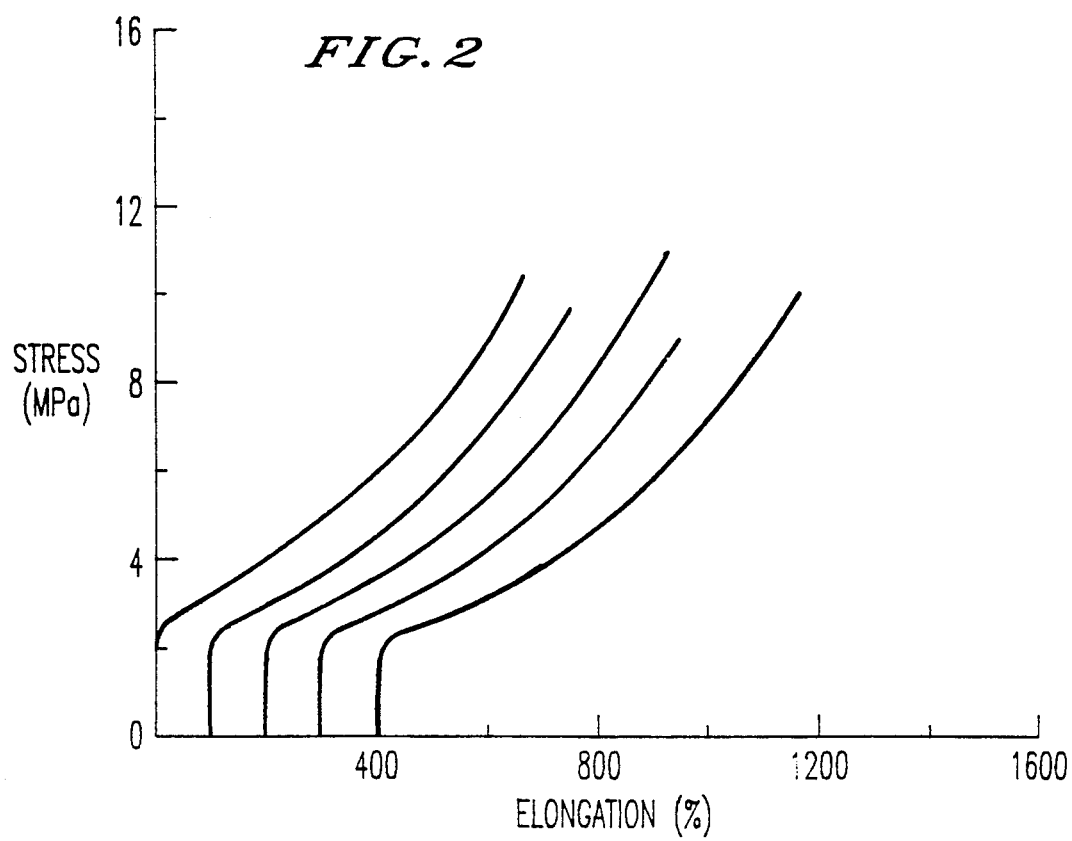
FIG. 2 is a graph showing stress-elongation curves for the product of Example 2.

An emulsion polymerizate, which was dried into a 0.5 mm thick foil was obtained (tensile test see FIG. 2)

$\sigma R = 10.0$ MPa
$\epsilon R = 697\%$

The material also shows no stickiness at elevated temperatures (e.g., 100° C.), but can be welded with a commercially available foil welder (no adhesion to device).

Example 3 (Comparison test)

Instead of ethyl acrylate, 300 g of butyl acrylate was polymerized in otherwise the identical manner as in Example 1 and 130 g of methyl methacrylate were grafted. A white, sticky film that shows stress whitening at the slightest stress was obtained.

Example 4 (Comparison test)

A mixture comprising 70 wt. % of a polyethylacrylate dispersion and 30 wt. % of a polyethylmethacrylate dispersion was prepared (the dispersions were prepared separately from one another) and a film was poured out. The resulting film was clear, extremely expandable, but had no strength (see FIG. 3). Furthermore, this initially clear film showed stress whitening at the slightest elongation.

Example 5 (Comparison test)

30 parts of ethyl methacrylate and 70 parts of ethyl acrylate were batch copolymerized directly. A sticky film of low mechanical strength was obtained (see FIG. 4).

Example 6 (Determination of blocking)

A dispersion was prepared in an analogous manner to Example 1, where the graft copolymerizate comprises 70 wt. % of a base polymer of ethyl acrylate, methacrylic acid, and allyl methacrylate in a proportion by weight of 99.8:0.1:0.1 and 30 wt. % of a graft monomer of ethyl methacrylate. The dispersion obtained was neutralized with ammonia; subsequently, absorptive paper N30 was coated (room temperature) therewith. Following drying (3 hours, 60° C.), the folded together paper was pressed with a force of 50 g/cm² and the block was determined.

| Room temperature (RT) to 50° C.: | it is possible to simply pull the paper apart |
|---|---|
| 60° C.: | destruction of the paper while tearing apart. |

Example 7 (Minimum film forming temperature (MFT))

The dispersion obtained according to Example 6 forms a transparent film at temperatures down to 0° C. The strength of the films obtained at low temperatures can be significantly raised by short-term heating to, for example, 70° C.

Example 8 (Isolation of polymerizate solids)

In addition to simply drying the dispersion, the polymerizate can also be obtained by freezing coagulation and subsequent drying at approximately 50° C. Despite a MFT of 0° C., the polymerizate is not sticky.

The following legends apply to the FIGS. 1–.

Figure 3:
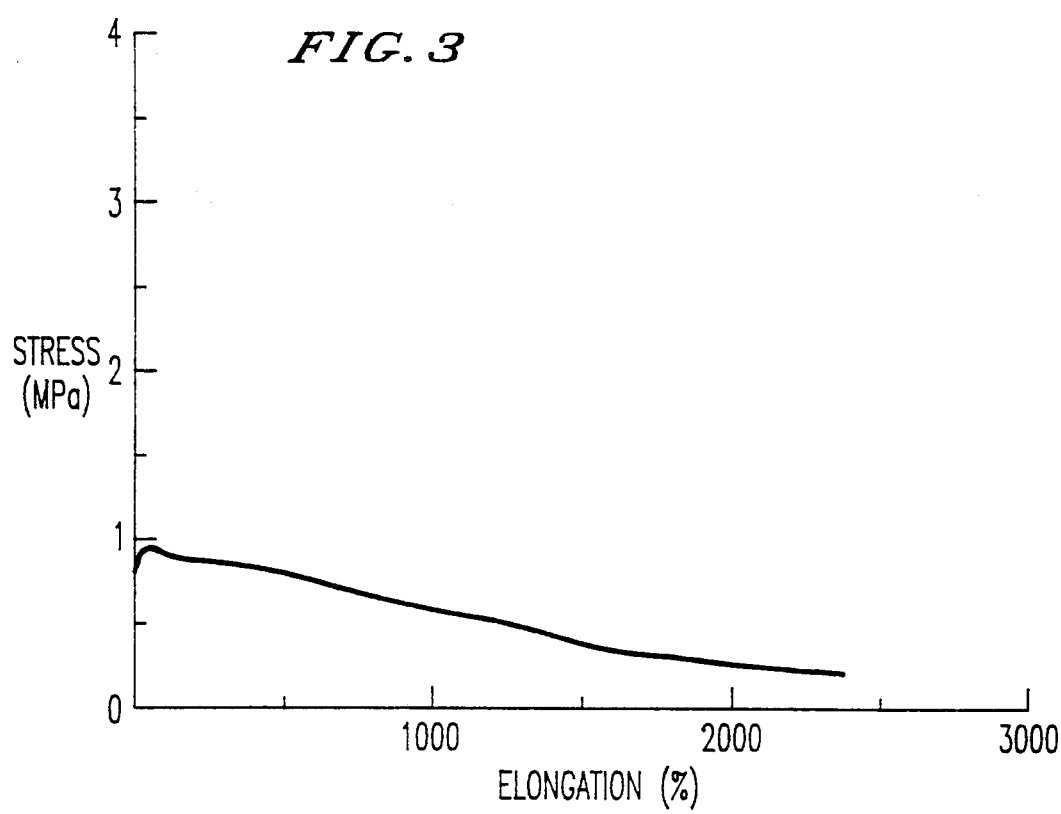
FIG. 3 is a graph showing a stress-elongation curve for the comparative product of Example 4.
Figure 4:
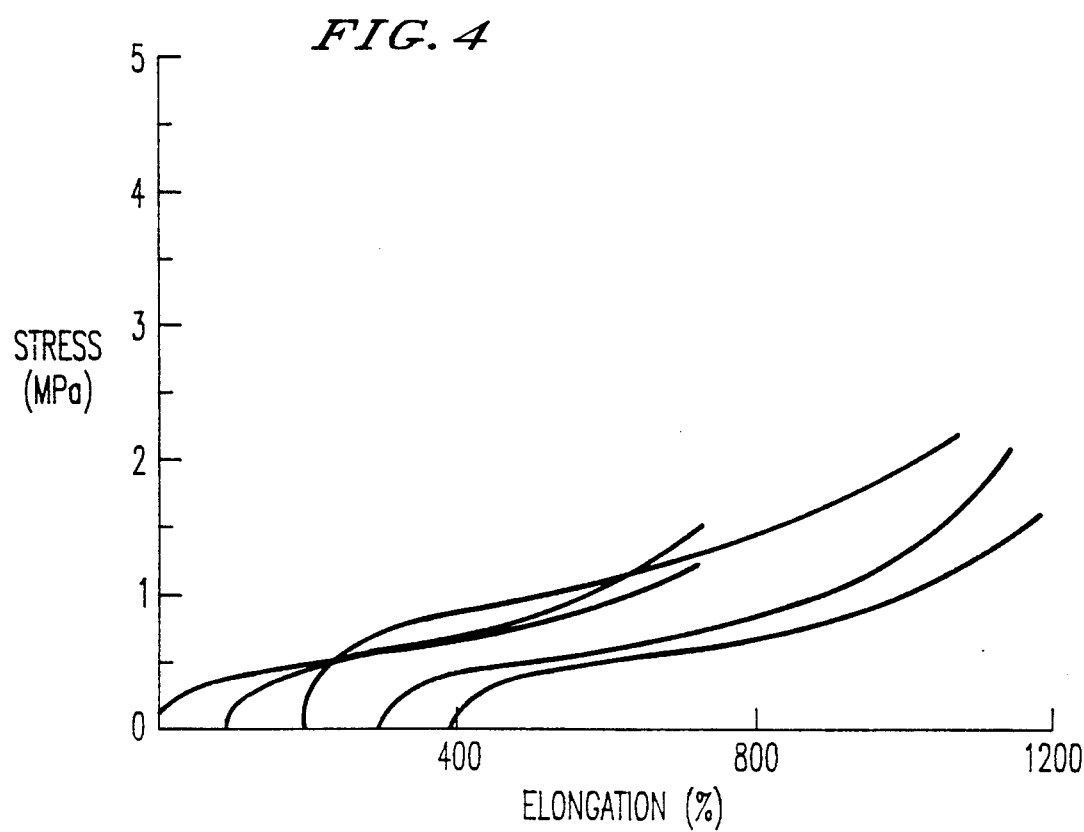
FIG. 4 is a graph showing stress-elongation curves for the comparative product of Example 5.

| FIG. 1-tensile test DIN 53 455 on samples according to Example 1: | |
|---|---|
| testing speed 1 for modulus of elasticity | 1.0 mm/min |
| testing speed 2 starting at 1.00% | 50.0 mm/min |
| measured length | 50.0 mm |
| sample width: 15 mm, sample thickness 0.47 mm (average) | |
| FIG. 2-tensile test DIN 53 455 on samples according to Example 2: | |
| testing speed 1 for modulus of elasticity | 1.0 mm/min |
| testing speed 2 starting at 1.00% | 50.0 mm/min |
| measured length | 50.0 mm |
| sample width: 15 mm, sample thickness 0.488 mm (average) | |
| FIG. 3-tensile test DIN 53 455 on a sample according to Example 4: | |
| testing speed 1 for modulus of elasticity | 1.0 mm/min |
| testing speed 2 starting at 1.00% | 50.0 mm/min |
| measured length | 50.0 mm |
| sample width: 15 mm, sample thickness 0.56 mm | |
| FIG. 4-tensile test DIN 53 455 on samples according to Example 5: | |
| testing speed 1 for modulus of elasticity | 1.0 mm/min |
| testing speed 2 starting at 1.00% | 50.0 mm/min |
| measured length | 50.0 mm |
| sample width: | 15 mm, sample thickness 0.40 mm (average) |
| | $\sigma R = 1.73$ mPa (average) $\epsilon R = 78.4\%$ (average) |

What is claimed as new and desired to be secured by Letters Patent of the United States is:

1. A graft polymerizate comprising:

graft monomers of the formula (I)

$$CH_2=C(CH_3)-COOR_1 \qquad (I)$$

wherein $R_1$ represents a hydrocarbon group having 2–24 carbon atoms; or a mixture thereof and
a base polymer comprising 55–100 wt. % of one or more monomers of the formula (II)

$$CH_2=CH-COOR_2 \qquad (II)$$

wherein $R_2$ represents a hydrocarbon group having 2-24 carbon atoms;

provided that said groups $R_1$ and $R_2$ exhibit Van-der-Waals volumes which differ by less than 30% and said graft monomers are polymerized so that at least 10 wt. %, based on the total monomers of formula (I), are grafted onto said base polymer.

2. The graft polymerizate as claimed in claim 1, wherein said base polymer further comprises 0.1 to 45 wt. % of one or more monomers different from said monomers of the formula (II) and copolymerizable with acrylates.

3. The graft polymerizate as claimed in claim 1, wherein said monomers comprising said base polymer are in 10:90 to 90:10 weight proportion to said graft monomers.

4. The graft polymerizate as claimed in claim 1, wherein said base polymer has a molecular weight in the range of from 200,000 to $10^9$ Daltons.

5. The graft polymerizate as claimed in claim 1, wherein said base polymer comprises 85-100 wt. % of said monomers of the formula (II).

6. The graft polymerizate as claimed in claim 1, wherein $R_1$ and $R_2$ each represent ethyl.

7. The graft polymerizate as claimed in claim 1, wherein $R_1$ represents isobutyl and $R_2$ represents n-butyl.

8. The graft polymerizate as claimed in claim 1 which is prepared by emulsion polymerization.

9. A process for the preparation of a graft polymerizate as claimed in claim 1, said process comprising:

forming an aqueous emulsion of one or more monomers of the formula (II)

$$CH_2=CH-COOR_2 \qquad (II)$$

wherein $R_2$ represents a hydrocarbon group having 2-24 carbon atoms;

polymerizing said so-formed aqueous emulsion by means of a radical initiator to form said base polymer;

adding one or more graft monomers of the formula (I)

$$CH_2=C(CH_3)-COOR_1 \qquad (I)$$

wherein $R_1$ represents a hydrocarbon group having 2-24 carbon atoms to said so-formed base polymer, and polymerizing said graft monomers in the presence of said base polymer so that at least 10 wt. %, based on the total monomers of formula (I), are grafted onto said base polymer;

provided that said groups $R_1$ and $R_2$ exhibit Van-der-Waals volumes which differ by less than 30%.

10. The process as claimed in claim 9, wherein said polymerization of said aqueous emulsion of said monomers of the formula (II) is conducted as a batch polymerization; and said polymerization of said 9raft monomers of the formula (I) in the presence of said base polymer is conducted as a feed polymerization.

11. A process for the preparation of a graft polymerizate as claimed in claim 1 said process comprising:

polymerizing in an extruder graft monomers of the formula (I)

$$CH_2=C(CH_3)-COOR_1$$

wherein $R_1$ represents a hydrocarbon group having 2-24 carbon atoms or a mixture thereof and a base polymer comprising 55-100 wt. % of one or more monomers of the formula (II)

$$CH_2=CH-COOR_2 \qquad (II)$$

wherein $R_2$ represents a hydrocarbon group having 2-24 carbon atoms;

provided that said groups $R_1$ and $R_2$ exhibit Van-der-Waals volumes which differ by less than 30% and said graft monomers are polymerized sc that at least 10 wt %, based on the total monomers of formula (I), are grafted onto said base polymer.

12. An aqueous dispersion of a graft polymerizate prepared by the process of claim 9.

13. A moulded body prepared from the graft polymerizate s claimed in claim 1.

14. A cast foil prepared from an aqueous dispersion of a graft polymerizate as claimed in claim 12.

* * * * *